(12) United States Patent
Degand

(10) Patent No.: US 6,946,622 B2
(45) Date of Patent: Sep. 20, 2005

(54) AUTOMOTIVE GLAZING PANEL HAVING AN ELECTRICALLY HEATABLE SOLAR CONTROL COATING LAYER PROVIDED WITH DATA TRANSMISSION WINDOWS

(75) Inventor: Etienne Degand, Jumet (BE)

(73) Assignee: Glaverbel, Brussels (BE)

( * ) Notice: Subject to any disclaimer, the term of this patent is extended or adjusted under 35 U.S.C. 154(b) by 0 days.

(21) Appl. No.: 10/221,850

(22) PCT Filed: Mar. 2, 2001

(86) PCT No.: PCT/EP01/02409
§ 371 (c)(1), (2), (4) Date: Jan. 28, 2003

(87) PCT Pub. No.: WO01/68395
PCT Pub. Date: Sep. 20, 2001

(65) Prior Publication Data
US 2004/0026397 A1 Feb. 12, 2004

(30) Foreign Application Priority Data
Mar. 14, 2000 (EP) .......................... 00200908

(51) Int. Cl.$^7$ ................................. B60L 1/02
(52) U.S. Cl. ..................... 219/203; 219/522; 219/541; 219/543
(58) Field of Search .............................. 219/203, 522, 219/541, 543; 52/171.2; 338/306–309

(56) References Cited

U.S. PATENT DOCUMENTS

| 4,668,270 A | 5/1987 | Ramus |
| 6,495,261 B1 * | 12/2002 | Gagliardi et al. ........... 428/426 |
| 6,538,192 B1 | 3/2003 | Coster et al. |
| 6,670,581 B1 | 12/2003 | Degand et al. |

FOREIGN PATENT DOCUMENTS

| DE | 3708577 A1 | 9/1988 | |
| DE | 3708577 A * | 9/1988 | .............. B60J/1/00 |
| EP | 0 378 917 A1 | 7/1990 | |
| EP | 0 702 423 A1 | 3/1996 | |
| EP | 0 726 232 A2 | 8/1996 | |
| JP | 02-046683 | 2/1990 | |
| WO | 00/72634 A1 | 11/2000 | |

* cited by examiner

Primary Examiner—Tu Ba Hoang
Assistant Examiner—Vinod Patel
(74) Attorney, Agent, or Firm—DLA Piper Rudnick Gray Cary US LLP

(57) ABSTRACT

An automotive glazing panel has an electrically heatable solar control coating layer, spaced first and second bus bars adapted to relay electrical power to the coating layer. The glazing panel is provided with at least two, spaced data transmission windows positioned at least partially in contact with the heatable solar control coating layer which are separated by a portion of the glazing panel which is in electrical contact with the electrically heatable solar control coating layer.

14 Claims, 4 Drawing Sheets

AUTOMOTIVE GLAZING PANEL HAVING AN ELECTRICALLY HEATABLE SOLAR CONTROL COATING LAYER PROVIDED WITH DATA TRANSMISSION WINDOWS

CROSS REFERENCE TO RELATED APPLICATIONS

This application is the U.S. National Stage of International Application No. PCT/EP01/02409 filed 2 Mar., 2001, and claims the priority of European Application No. 00900908.2 filed 14 Mar. 2000. The entirety of each of those applications is incorporated herein by reference.

This invention relates to glazing panels and particularly but not exclusively to a vehicle windscreen having an electrically heatable coating layer provided with a data transmission window.

Although the invention is described herein with particular reference to car windscreens it will be understood that it has applications to other vehicle glazing panels, for example rear window and side windows.

U.S. Pat. No. 4,668,270 (Ford Motor Company) describes a car windscreen having an electrically heatable coating layer used for defrosting, de-icing and/or de-misting. The heatable coating, which is laminated between the two glass sheets of the windscreen, is supplied with electrical power via first and second bus bars which extend respectively along the top and bottom edges of the windscreen, each bus bar being silk screen printed on the glass in a silver ceramic material. The heatable coating is a multilayer coating consisting of zinc oxide and silver formed by magnetron sputtering.

Coating layers are well know not only to provide an electrically heatable element but also to modify the optical properties of the glass, particularly to reduce the proportion of incident solar energy which is transmitted through the glass whilst allowing passage of sufficient visible light to ensure good visibility. This can reduce overheating of the interior of the vehicle in summer and is commonly achieved by reflection of incident solar radiation in the infra-red portion of the spectrum. EP378917A (Nippon Sheet Glass Co.) discloses such coating layers. The term solar control coating layer as used herein refers to a coating layer which increases the selectivity of the glazing panel i.e. the ratio of the proportion of incident visible radiation transmitted through the glazing to the proportion of incident solar energy transmitted through the glazing. Many solar control coating layers have the intrinsic property of being electrically heatable.

Sensors or emitters arranged inside a car may rely on passage of an electromagnetic data transmission signal through the windscreen. For example, passage of an electromagnetic data signal for automatic payment at the toll barriers used on the French motorway system may pass through the windscreen. However, passage of such electromagnetic data transmission signals may be hindered by the presence of a solar control coating and, consequently, a data transmission window in the form of a gap or hole may be provided in a solar control coating layer specifically to allow the passage of electromagnetic waves through that portion of the glazing. This principle is applicable to allowing passage of any electromagnetic data transmission signal through a glazing panel and particularly, but not exclusively, signals using infra-red wavelengths. The term data transmission window as used herein refers to a portion of the surface area of a glazing adapted to permit electromagnetic data transmission therethrough.

FIG. 1 shows a simulation of a heated car windscreen 10 having an electrically heatable coating layer over its entire surface supplied with electrical power by a first bus bar 11 and second bus bar 12. The windscreen is a laminated structure comprising two sheets of glass laminated together by means of a sheet of pvb, the electrically heatable coating layer and the bus bars being sandwiched between the two sheets of glass. It can be seen that a slight "hot spot" 13 is created around each end of the second bus bar 12. A data transmission window 20 is incorporated in the arrangement. The data transmission window is a portion of this windscreen that does not have the heatable coating layer. As can be seen from the representation of the temperature at different points of the windscreen the data transmission window causes the following perturbations:

- an upper portion of the windscreen 21 at and around the data transmission window is not heated at all;
- a central portion 22 is heated but to a lesser extent than if the data transmission window is not present—consequently this portion will take longer to de-mist or de-ice than in a scenario without a data transmission window;
- hot spots 23 and 24 are created adjacent to the data transmission window—this is undesirable as such local overheating may damage or even burn the heatable coating layer and/or the adjacent pvb layer. It is also important to ensure that no portion of the windscreen is heated to such an extent that its temperature could cause burns to somebody touching it.

Whilst it would of course be possible to reduce the electrical power supplied to the bus bars so as to reduce the temperature of the "hot spots" this would of course reduce the temperature of the other parts of the windscreen at the same time and increase the time taken to de-mist or de-ice the overall windscreen.

SUMMARY OF THE INVENTION

All of the figures are intended to give an indication of the relative temperatures at different portions of the glazing panel. The absolute temperatures will depend, inter alia, upon the nature of the heatable coating layer and the electrical voltage difference between the two bus bars (i.e. the power supplied to the windscreen). In addition, the figures are intended to give an indication of the "stable" or "equilibrium" temperature distribution once the glazing panel has been heated for sufficient time to reach its maximum heated temperature. The scale of relative temperatures varies from one figure to another. Furthermore, the electrical connection of the bus bars to an electrical source, e.g. a vehicle battery or alternator, is not shown in the figures and, indeed, the position of the bus bars 11, 12 (which is identical in each case) is only shown on FIG. 1.

According to one aspect, the present invention provides a glazing panel as defined in claim 1.

This may be used to reduce the perturbation to the heating of the glazing caused by the presence of a data transmission window whilst permitting sufficient surface area and adequate position of the data transmission windows to allow sufficient data transmission through the glazing. In particular, it may reduce or preferably eliminate the presence of undesirable hot spots and/or reduce the temperature difference between certain portions of the glazing.

Each data transmission window may be dimensioned such that it is at least 30 mm, 40 mm, 50 mm or 70 mm high by at least 40 mm, 50 mm, 60 mm, 80 mm or 100 mm wide. Each data transmission window may be dimensioned such that it is no greater than at 60 mm, 70 mm or 80 mm high by 80 mm, 100 mm, 120 mm or 150 mm wide.

The heatable coating layer may be a sputtered deposited coating, for example having the general structure antireflective dielectric layer/optional barrier layer/silver containing conductive layer/optional barrier layer/antireflective dielectric layer/optional barrier/silver containing conductive layer/optional barrier layer/antireflective dielectric layer. Such coatings are used in automotive glazings to increase the selectivity of the glazing (i.e. the ratio of the proportion of visible light transmitted to the proportion of incident solar energy transmitted) to reduce the solar heating or greenhouse effect in the vehicle. Such coating layers typically have a resistance in the order of 2 to 4 ohms per square. Alternatively, the heatable coating layer may have a single silver containing layer of the general structure antireflective dielectric layer/optional barrier layer/silver containing conductive layer/optional barrier layer/antireflective dielectric layer.

A further possibility is for the heatable coating layer to comprise a pyrolytically deposited layer based, for example on doped tin oxide. This might have a resistance in the order of 8–20 ohms per square.

The heatable coating layer may be sandwiched between two sheets of glass or it may be an exposed coating layer, for example on a monolithic glazing panel.

The heatable coating layer may be deposited directly on a surface of the glazing or it may be carried on a film, for example a film of PET incorporated in the glazing.

The heatable solar control coating layer may cover the entire or substantially the entire surface area of the glazing panel, for example, it may cover at least 70%, 75% 80%, 85%, 90% or 95% of the glazing panel; it may be a substantially continuous layer. The heatable solar control coating layer is preferably substantially transparent, that is to say that portions of the glazing panel at which the heatable solar control coating layer is present preferably have a luminous transmittance measured using Illuminant A of at least 55%, at least 60%, at least 65%, at least 70% or at least 75%. This may allow a continuous solar control coating layer to be arranged across substantially the entire surface of the glazing whilst still allowing the passage of sufficient visible light through the glazing panel to provide clear vision.

At a substantially central or a visibility critical portion of the glazing panel, the heatable solar control coating layer is preferably continuous and the glazing panel at this portion preferably has a luminous transmittance measured using Illuminant A of at least 55%, at least 60%, at least 65%, at least 70% or at least 75%.

The invention is particularly useful if the data transmission window is substantially or entirely surrounded by the heatable coating layer or substantially or entirely contained within or bounded by the heatable coating layer as it is in these cases that the perturbations caused by its presence will generally be greatest. The data transmission windows may be positioned between the two bus bars. The data transmission windows may be spaced by a distance of less than 200 mm, 150 mm, 100 mm, 80 mm or 50 mm from at least one of the bus bars.

Generally, the greater the interruption or gap in the coating layer caused by the presence of the data transmission window the greater the resulting perturbation in the heating of the glazing. Consequently, the invention may be particularly beneficial with respect to elongate data transmission windows, particularly when these are positioned near or adjacent to one of the bus bars. Data transmission windows in solar energy reflecting windscreens have generally been arranged towards the top edge of the windscreen, roughly centrally between the two side edges. This facilitates orientation and positioning of data transmitting and/or receiving instruments. The invention is particularly suitable to allow this arrangement whilst in addition heating the coating layer provided on the glazing and minimising the heating perturbation that would otherwise be caused by the data transmission window.

The glazing panel may be provided with more than two spaced data transmission windows, for example, three, four, five or more.

Each data transmission window may be adapted to function independently of the other data transmission window. The arrangement may be adapted so that only one of the data transmission windows is used to either transmit or receive data at any one time.

The invention may be used, for example, to enable a data transmission windows to be provided in a windscreen so that they are positioned and sized in such a way that the windscreen is adapted for use in both right hand and left hand drive vehicles.

Spacing the at least two data transmission by at least 40 mm may provide a sufficient separation to significantly improve the heating characteristics of the glazing. The at least two data transmission windows may be spaced by at least 30 mm, 50 mm, 60 mm, 70 mm, 80 mm, 100 mm, 120 mm, 140 mm or more. The optimum spacing may depend, inter alia, upon the geometrical form of the data transmission windows and/or the separation of the data transmission windows from the bus bars. In some preferred embodiments, the at least two data transmission windows may be spaced by at least 150 mm, 160 mm, 180 mm, 190 mm, 200 mm, 220 mm, 240 mm or more.

According to another aspect, the present invention provides a method of controlling temperature distribution over a heated glazing panel as defined in claim 10.

The method may be used to prevent or reduce the phenomena of hot spots.

BRIEF DESCRIPTION OF THE DRAWINGS

Embodiments of the invention will now be described, by way of example only, with reference to the remaining figures, all of which are simulations of the heating effect of a windscreen.

DETAILED DESCRIPTION

Windscreens 10 illustrated in FIG. 2, FIG. 3, FIG. 4 FIG. 5 and FIG. 6 comprises an inner sheet of glass laminated to an outer sheet of glass by means of a sheet of pvb. A heatable coating layer having a resistance of about 3 ohms per square, a first bus bar 11 and a second bus bar 12 (shown only on FIG. 1) are arranged between the two sheets of glass. Two spaced data transmission windows 30, 31 (i.e. portions at which there is no heatable coating layer) are arranged substantially centrally with respect to the width of the windscreen adjacent to the first bus bar 11.

Figure 6:
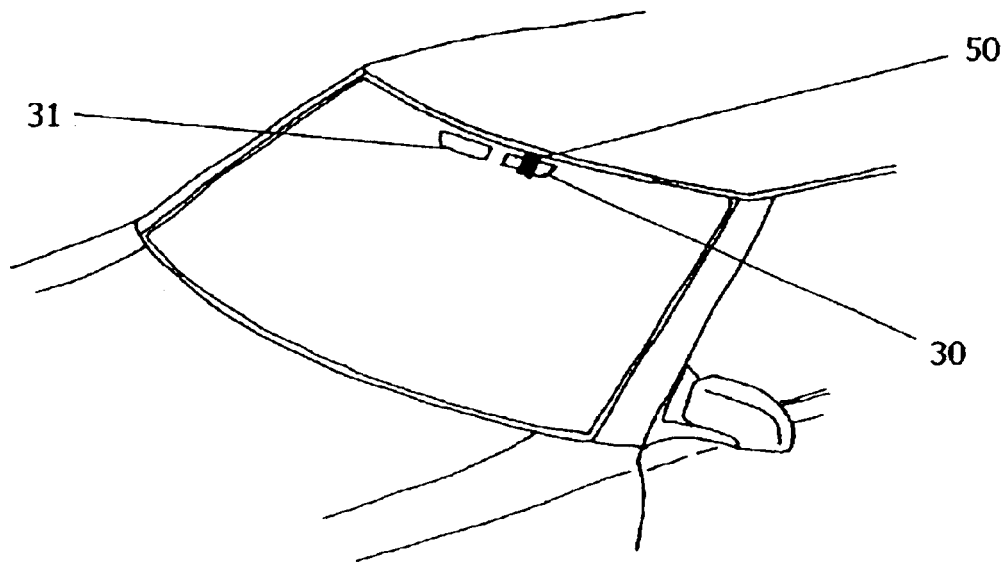

In FIG. 6, which also shows the two spaced data transmission windows 30, 31 (i.e. portions at which there is no heatable coating layer) there is also illustrated a device 50 which may be an emitter, receiver or combination emitter/receiver (transceiver) to emit/receive, as applicable, non-visible electromagnetic data signals through a data transmission window.

Figure 1:
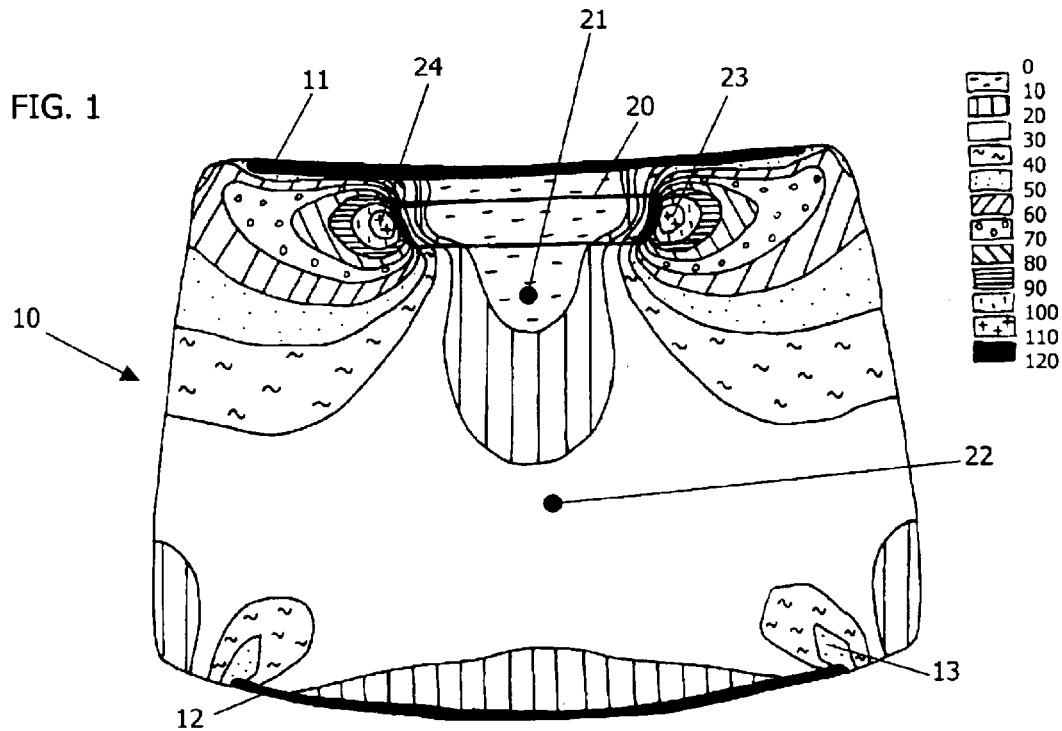
Figure 2:
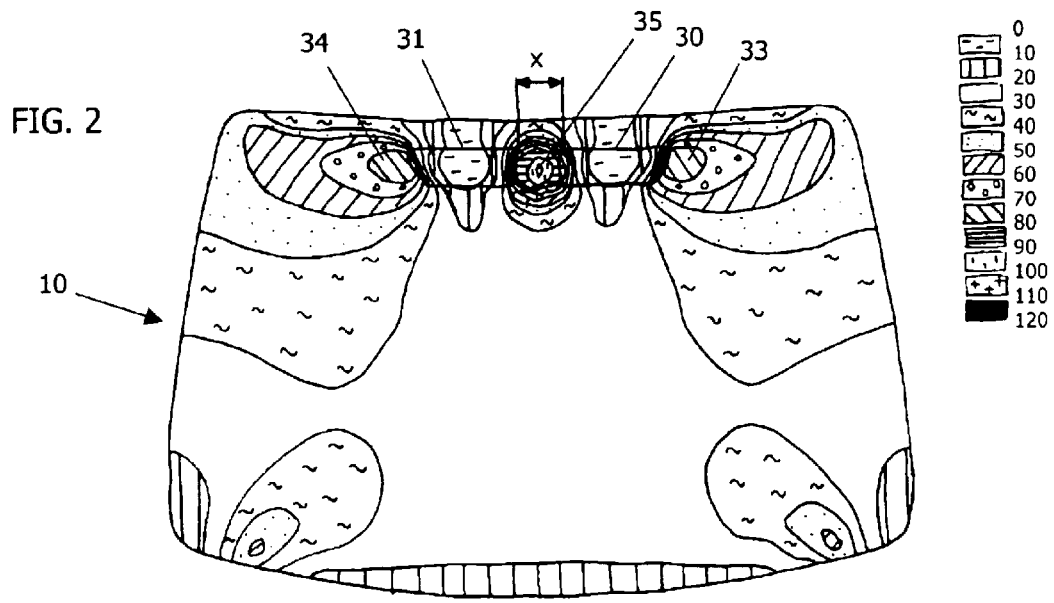

In FIG. 2, the two data transmission windows are separated by a distance x of about 75 mm measured along the length of the first bus bar. Each data transmission window is about 180 mm wide by about 60 mm high. Heating of the windscreen by means of supplying electrical power via the bus bars produces the illustrated heating pattern. It can be seen in particular that although hot spots 33, 34 are present at the sides of the data transmission window these are less pronounced than in the arrangement of FIG. 1 (i.e. with a single data transmission window). There is however a slight hot spot 35 between the two data transmission windows; this may or may not be acceptable in practice depending on the electrical power to be applied and the exact configuration of the glazing panel.

Figure 3:
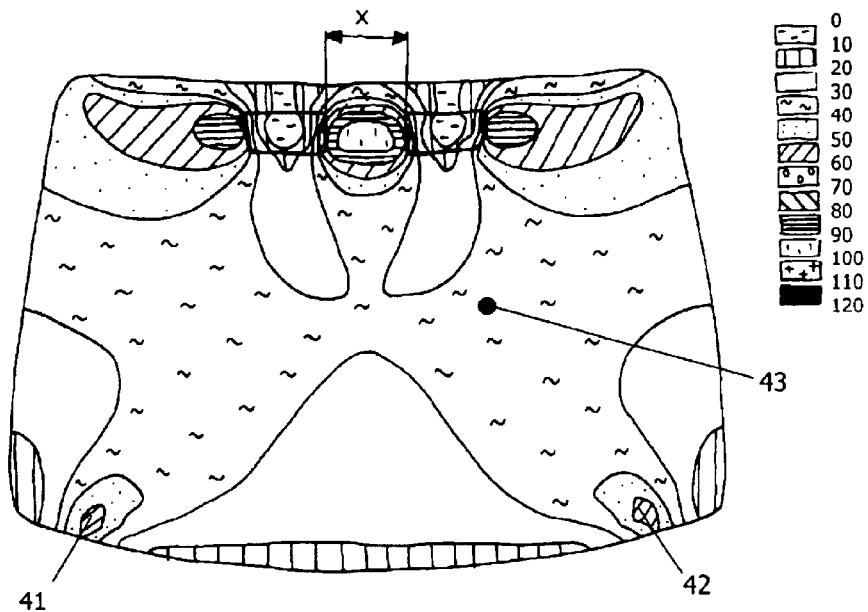

In FIG. 3, each data transmission window is about 150 mm wide by about 60 mm high; the two data transmission windows are separated by a distance x of about 142 mm. Heating of the windscreen by means of supplying electrical power via the bus bars produces the illustrated heating pattern. It can be seen in particular that:

the difference in temperature between portion 43 of the windscreen (in an area that is particularly important for driver visibility) and the hottest portion of the windscreen is significantly less that the case of using a data transmission window without the benefit of the present invention (FIG. 1). This is advantageous for heating this particular (visibility critical) portion of the windscreen without creating significant undesirable overheating in other portions.

no significant hot spots are produced at the sides of the data transmission windows in this simulation or, indeed, between the two data transmission windows the temperature of the central portion of the windscreen is greater than that obtained without the benefit of the invention slight hot spots 41, 42 are produces at each end of the second bus bar 12 (as is the case with the single data transmission window or FIG. 1).

The power supplied in the case of FIG. 3 could be reduced so that the temperature of the central portion of the windscreen has the same temperature as the simulation with a single data transmission window (FIG. 1). Not only will this lower the temperature of each portion of the windscreen allowing, for example, the temperature of the hot spots produced at each end of the second bus bar 12 to be reduced but it would also reduce the overall power required by the windscreen to produce a desired heating effect.

Figure 4:
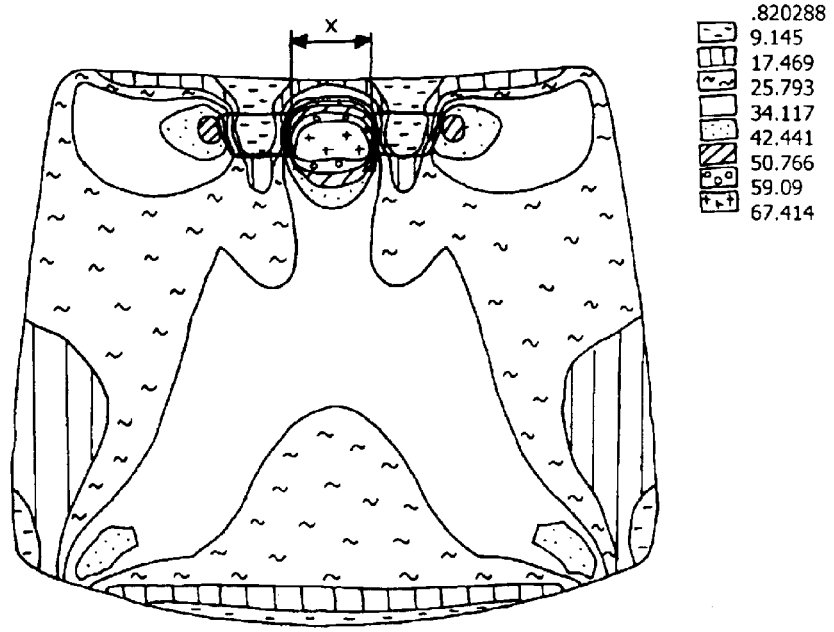
Figure 5:
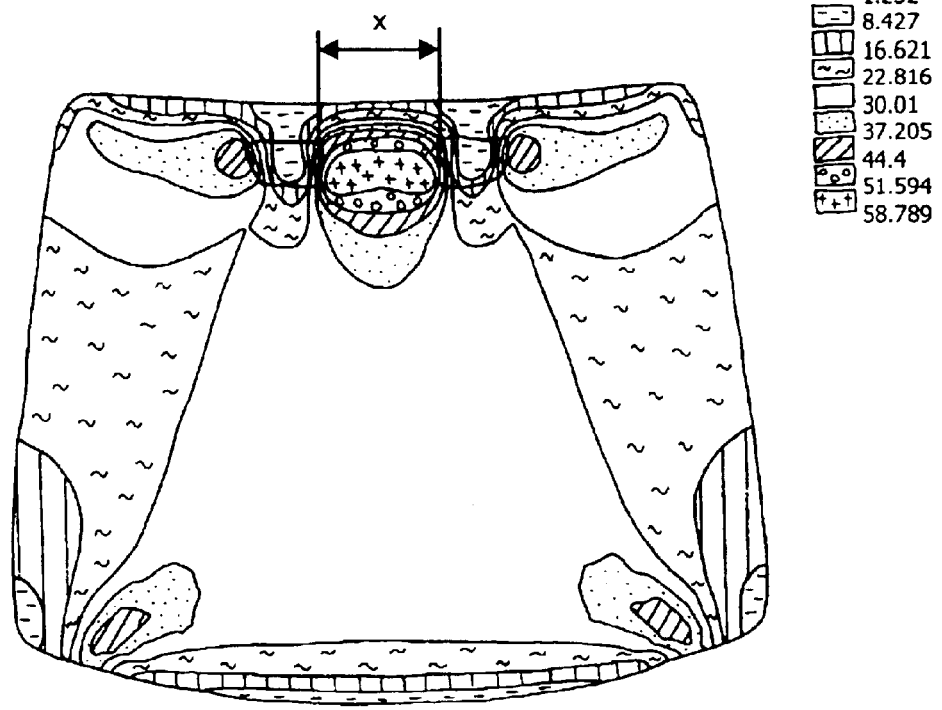

FIGS. 4 and 5 show alternative heating characteristics. In FIG. 4, each data transmission window is about 130 mm wide by about 60 mm high and the two data transmission windows are separated by a distance x of about 175 mm. In FIG. 5, each data transmission window is about 110 mm wide by about 60 mm high and the two data transmission windows are separated by a distance x of about 220 mm.

Further improvements to the heating characteristics may be achieved by optimising the peripheral shape of the data transmission windows. For example, providing each data transmission window with rounded rather than sharp corner may further reduce the tendency to create hot spots at or around these points.

The data transmission windows my by formed, for example, by means of masking during deposition of the electrically heatable coating layer or by removal of the electrically heatable coating layer.

A convenient way of measuring the resistance per square of the conducting band and/or of the coating layer is using a four point measurement of resistance, as known in the art, for example using a four point resistance measurement device manufactured by Advanced Electronic Developments A.E.D.B. Sprl.

The invention may advantageously be combined with one or more know techniques or procedures in this art, for example:

spacing the electrically heatable coating layer from the external periphery of the windscreen by a non-conducting peripheral band (in which the coating layer has either not been deposited or has been removed) to prevents the electrically conductive coating extending to the very edge of the windscreen and/or to reduce the risk of corrosion of the coating layer;

arranging for terminal connections to the bus bars to be positioned together to facilitate connection to a vehicle electrical system.

What is claimed is:

1. An automotive windscreen glazing panel having an electrically heatable solar control coating layer and spaced first and second bus bars adapted to relay electrical power to the coating layer characterised in that the glazing panel is provided with at least two, spaced data transmission windows positioned at least partially in contact with the heatable solar control coating layer which are separated by a portion of the glazing panel which is in electrical contact with the electrically heatable solar control coating layer, wherein portions of the glazing panel at which the heatable solar control coating layer is present have a luminous transmittance measured using Illuminant A of at least 55%.

2. An automotive glazing panel in accordance with claim 1, further characterised by at least one of the following features (a) through (f):
   (a) the portion of the glazing panel which separates the at least two spaced data transmission windows and which is in electrical contact with the electrically heatable solar control coating layer forms part of the electrically heatable solar control coating layer;
   (b) the at least two data transmission windows are spaced by a distance of at least 80 mm;
   (c) the at least two data transmission windows are at least substantially surrounded by the electrically heatable solar control coating layer;
   (d) at least two data transmission windows is positioned adjacent to one of the bus bars;
   (e) each of the at least two data transmission windows is at least 40 mm wide and at least 20mm in height; and
   (f) at least one of the bus bars extends along a top portion of the glazing panel adjacent to a top edge of the glazing panel.

3. An automotive glazing panel in accordance with claim 2, further including at least two of the aforementioned features (a) through (f).

4. An automotive glazing panel in accordance with claim 2, and further including at least four of the aforementioned features (a) through (f).

5. An automotive glazing panel in accordance with claim 2, and further including all of the aforementioned features (a) though (f).

6. An automotive glazing panel in accordance with claim 2, in which feature (b) is selected and further that said distance is at least 100 mm.

7. An automotive glazing panel in accordance with claim 2, in which feature (c) is selected and further that the at least two data transmission windows are entirely surrounded by said electrically heatable solar control coating layer.

8. An automotive glazing panel in accordance with claim 1, in which there are two spaced data transmission windows arranged towards the top edge of the glazing panel and positioned substantially symmetrically about a central axis passing from the top to the bottom edge of the glazing panel.

9. An automotive windscreen glazing panel in accordance with claim 1, in which the interior of the vehicle is provided with at least one of the following:

(g) an emitter arranged to emit a non-visible electromagnetic data signal through at least one of the data transmission windows;

(h) a receiver arranged to receive non-visible electromagnetic data signal through at least one of the data transmission windows.

10. An automotive windscreen glazing panel in accordance with claim 1, in which the luminous transmittance measured using Illuminant A is at least 60%.

11. An automotive windscreen glazing panel in accordance with claim 1, in which the luminous transmittance measured using Illuminant A is at least 65%.

12. An automotive windscreen glazing panel in accordance with claim 1, in which the luminous transmittance measured using Illuminant A is at least 70%.

13. An automotive windscreen glazing panel in accordance with claim 1, in which the luminous transmittance measured using Illuminant A is at least 75%.

14. In an automotive glazing panel having an electrically heatable solar control coating layer, spaced first and second bus bars adapted to relay electrical power to the coating layer, and a first data transmission window, the improvement characterised by:

providing at least a second data transmission window; and reducing uneven heating of the glazing panel by arranging at least the first and second data transmission windows in a spaced relationship and at least partially in contact with the solar control coating layer and separated by a portion of the glazing panel which is in electrical contact with the electrically heatable solar control coating layer, wherein portions of the glazing panel at which the heatable solar control coating layer is present have a luminous transmittance measured using Illuminant A of at least 55%.

* * * * *